United States Patent
Peltier et al.

(10) Patent No.: US 12,065,935 B2
(45) Date of Patent: Aug. 20, 2024

(54) TURBOMACHINE EQUIPPED WITH ELECTRIC MACHINES COUPLED TO A COUPLING SURFACE

(71) Applicant: SAFRAN TRANSMISSION SYSTEMS, Colombes (FR)

(72) Inventors: Jordane Emile André Peltier, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 93 days.

(21) Appl. No.: 17/999,701

(22) PCT Filed: May 19, 2021

(86) PCT No.: PCT/FR2021/050886
§ 371 (c)(1),
(2) Date: Nov. 22, 2022

(87) PCT Pub. No.: WO2021/240095
PCT Pub. Date: Dec. 2, 2021

(65) Prior Publication Data
US 2023/0203963 A1 Jun. 29, 2023

(30) Foreign Application Priority Data
May 27, 2020 (FR) ........................................ 2005598

(51) Int. Cl.
*F01D 15/10* (2006.01)
*F02C 7/32* (2006.01)

(52) U.S. Cl.
CPC ................ *F01D 15/10* (2013.01); *F02C 7/32* (2013.01); *F05D 2220/76* (2013.01); *F05D 2260/4031* (2013.01)

(58) Field of Classification Search
CPC .... F02C 7/32; F02C 7/36; F02C 7/275; F02C 3/107; F01D 15/10; F01D 15/12;
(Continued)

(56) References Cited

U.S. PATENT DOCUMENTS 5,694,765 A * 12/1997 Hield ...................... F02C 3/113
60/39.163
7,484,354 B2 * 2/2009 Stretton .................... F02C 7/32
60/226.1
(Continued)

FOREIGN PATENT DOCUMENTS

EP 2 239 440 A1 10/2010
EP 3 511 549 A1 7/2019
(Continued)

OTHER PUBLICATIONS

English translation of Written Opinion mailed Sep. 9, 2021, issued in corresponding International Application No. PCT/FR2021/050886, filed May 19, 2021, 6 pages.
(Continued)

*Primary Examiner* — Eric J Zamora Alvarez
(74) *Attorney, Agent, or Firm* — CHRISTENSEN O'CONNOR JOHNSON KINDNESS PLLC

(57) ABSTRACT

A turbomachine includes a fan, a first casing with longitudinal axis X in which a motor shaft is rotated around the longitudinal axis X, a second casing surrounding and coaxial with the first casing, and a drive shaft connected to the motor shaft. The driveshaft is also connected to at least two electric machines via a power transmission angle gear device housed in a housing. The electric machines being intended are configured to take or inject power on the motor shaft. The housing has a coupling surface to which the two electric machines are coupled.

12 Claims, 3 Drawing Sheets

(58) Field of Classification Search
CPC .. F01D 25/24; F01D 25/34; F05D 2260/4031; F05D 2220/76; F05D 2220/323; F05D 2250/313; F05D 2260/40311; F05D 2250/314; F05D 2240/60; F05D 2220/50; F05D 2250/31; F05D 2250/75; F05D 2250/312; F05D 2260/40; B64D 41/00; B64D 2033/0213; B64D 2221/00; F16H 57/02

See application file for complete search history.

(56) References Cited

U.S. PATENT DOCUMENTS

| | | | | |
|---|---|---|---|---|
| 8,042,341 | B2* | 10/2011 | Charier | F02K 3/06 60/788 |
| 8,333,554 | B2* | 12/2012 | Chaudhry | F02C 7/36 415/122.1 |
| 8,424,416 | B2* | 4/2013 | Short | F01D 15/10 74/423 |
| 8,966,911 | B2* | 3/2015 | Ress, Jr. | F02C 7/275 60/788 |
| 9,677,415 | B2* | 6/2017 | Moliner-Cantos | H02K 7/116 |
| 2011/0154827 | A1 | 6/2011 | Ress, Jr. et al. | |
| 2016/0245183 | A1* | 8/2016 | Viel | F02C 7/32 |
| 2016/0333793 | A1* | 11/2016 | Prunera-Usach | F02C 3/04 |
| 2017/0306854 | A1* | 10/2017 | Guillemont | H02K 5/203 |
| 2019/0048801 | A1* | 2/2019 | Guillemont | F02C 7/32 |
| 2021/0324799 | A1* | 10/2021 | Suzuki | F01D 15/10 |

FOREIGN PATENT DOCUMENTS

| | | |
|---|---|---|
| FR | 3 011 882 A1 | 4/2015 |
| FR | 3 041 052 A1 | 3/2017 |

OTHER PUBLICATIONS

International Preliminary Report on Patentability mailed Nov. 17, 2022, issued in corresponding International Application No. PCT/FR2021/050886, filed May 19, 2021, 6 pages.

International Search Report mailed Sep. 9, 2021, issued in corresponding International Application No. PCT/FR2021/050886, filed May 19, 2021, 7 pages.

Written Opinion mailed Sep. 9, 2021, issued in corresponding International Application No. PCT/FR2021/050886, filed May 19, 2021, 5 pages.

* cited by examiner

TURBOMACHINE EQUIPPED WITH ELECTRIC MACHINES COUPLED TO A COUPLING SURFACE

FIELD OF THE INVENTION

The present invention relates to the field of turbomachines for aircraft, and in particular to turbomachines equipped with electric machines.

BACKGROUND

The prior art comprises the documents FR-A1-3041052, US-A1-2011/1544827, EP-A1-3511549 and EP-A1-2239440.

An aircraft turbomachine, such as a double-flow turbomachine, generally comprises a ducted fan arranged at the inlet of the turbomachine and which is driven in rotation by a low-pressure shaft. A reducer can be interposed between the fan and the low-pressure shaft so that the fan rotates at a lower speed than that of the low-pressure shaft. The reduction in speed also allows the fan size to be increased, allowing high bypass ratio to be achieved.

In addition to the propulsion of the aircraft, the turbomachine ensures the production of electrical current using typically a permanent magnet alternator (generally referred to as PMA meaning "Permanent Magnet Alternator") and an accessory gearbox (AGB) to supply various equipment or accessories necessary for the operation of the turbomachine or the aircraft, such as the lighting of the cabin of the aircraft, the operability of a conditioning and air pressurisation system for the cabin of the aircraft or the supply of a lubrication pump for rotating members of the turbomachine.

It is known to equip the accessory gear box with an electric machine which is an electromechanical device based on electromagnetism allowing the conversion of electrical energy for example into mechanical energy (generator mode) or in a reversible way, allowing the production of electricity from mechanical energy (motor mode). The electric machine can behave equally well in generator mode as in motor mode.

Faced with the environmental challenge in the aeronautical field and the growing need for electrical power as the number of equipment and new functions of the aircraft increases, it is necessary to find and complete these sources of energy; the question of hybridisation of the turbomachine is therefore raised.

The arrangement of the electric machine within the AGB does not allow to provide a significant gain in electrical power for the increase in electrical power to all of the functions of the aircraft and the efficiency of the conversion of mechanical power to electrical power is not at its maximum. In addition, the integration of the electric machine in various areas of the turbomachine is complex and is constrained by overall dimension requirements, the temperature resistance of certain components of the electric machine, the accessibility, the performance of the turbomachine itself, etc.

SUMMARY OF THE INVENTION

In particular, the present invention aims to provide a solution that allows the integration of one or more items of equipment into the turbomachine while avoiding penalising the mass of the turbomachine.

This is achieved, in accordance with the invention, by means of a turbomachine comprising a fan, a first casing with a longitudinal axis X in which a motor shaft is driven in rotation along the longitudinal axis X, a second casing surrounding and coaxial with the first casing, and a drive shaft connected to the motor shaft, the drive shaft being connected, on the other hand, to at least two electric machines via a power transmission angle gear device housed in a case, the electric machines being intended to collect or inject power to the motor shaft, and in that the case comprises a coupling surface to which the two electric machines are coupled.

Thus, this solution allows to achieve the above-mentioned objective. In particular, the configuration of a single case housing the mechanical transmission angle gear device and a single drive shaft facilitates the integration of several items of equipment such as electric machines to increase the mechanical and electrical power in the turbomachine and allows a saving in axial overall dimension. The coupling surface facilitates the arrangement of the electric machines in relation to the case.

The turbomachine also comprises one or more of the following characteristics, alone or in combination:
- the case is formed integral with the second casing.
- the case is formed integral with the first casing.
- the power transmission angle gear device comprises a main shaft with an axis substantially parallel to the longitudinal axis and which is intended to drive power transmission shafts of the two electric machines.
- each electric machine comprises a power transmission shaft that passes through the coupling surface, each power transmission shaft being arranged perpendicular to the coupling surface.
- the power transmission shafts of the electric machines are arranged parallel to each other.
- the power transmission shafts of the electric machines are inclined with respect to each other.
- the drive shaft extends substantially radially at least partly between the first casing and the second casing.
- the drive shaft is housed in a structural element which is a casing arm or a stator vane and which extends at least partly between the first casing and the second casing.
- the main shaft, housed in the case, comprises a first toothed wheel meshing with a first input pinion mounted on a first end of the drive shaft and a second toothed wheel intended to mesh with at least two output wheels which are respectively carried by a power transmission shaft coupled to an electric machine.
- the turbomachine comprises a third casing which is coaxial with and surrounds the second casing, the second casing and the third casing delimiting at least partly a flow duct for a secondary air flow generated by the fan, and in that the electric machines are arranged in the flow duct.
- the case is formed integral with the third casing.
- the motor shaft comprises an input wheel coaxial with the longitudinal axis X and cooperating with a first output pinion mounted at a second end of the drive shaft.
- the first casing and the second casing at least partly delimit a flow duct for a primary air flow generated by the fan.
- the fan is driven by the motor shaft by means of a speed reducer.
- the pinions and the wheels are bevelled.
- each electric machine comprises an envelope which is attached to the first casing, the second casing or the third casing. each electric machine comprises a stator and a rotor, each rotor being coupled in rotation to a power transmission shaft.

the drive shaft is enveloped by a casing which comprises an interface surface complementary to an interface surface of the case, the casing comprising an orifice coaxial with an opening of the case, the first output pinion of the drive shaft extends outside the casing.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the following attached figures.

DETAILED DESCRIPTION OF THE INVENTION

Figure 1:
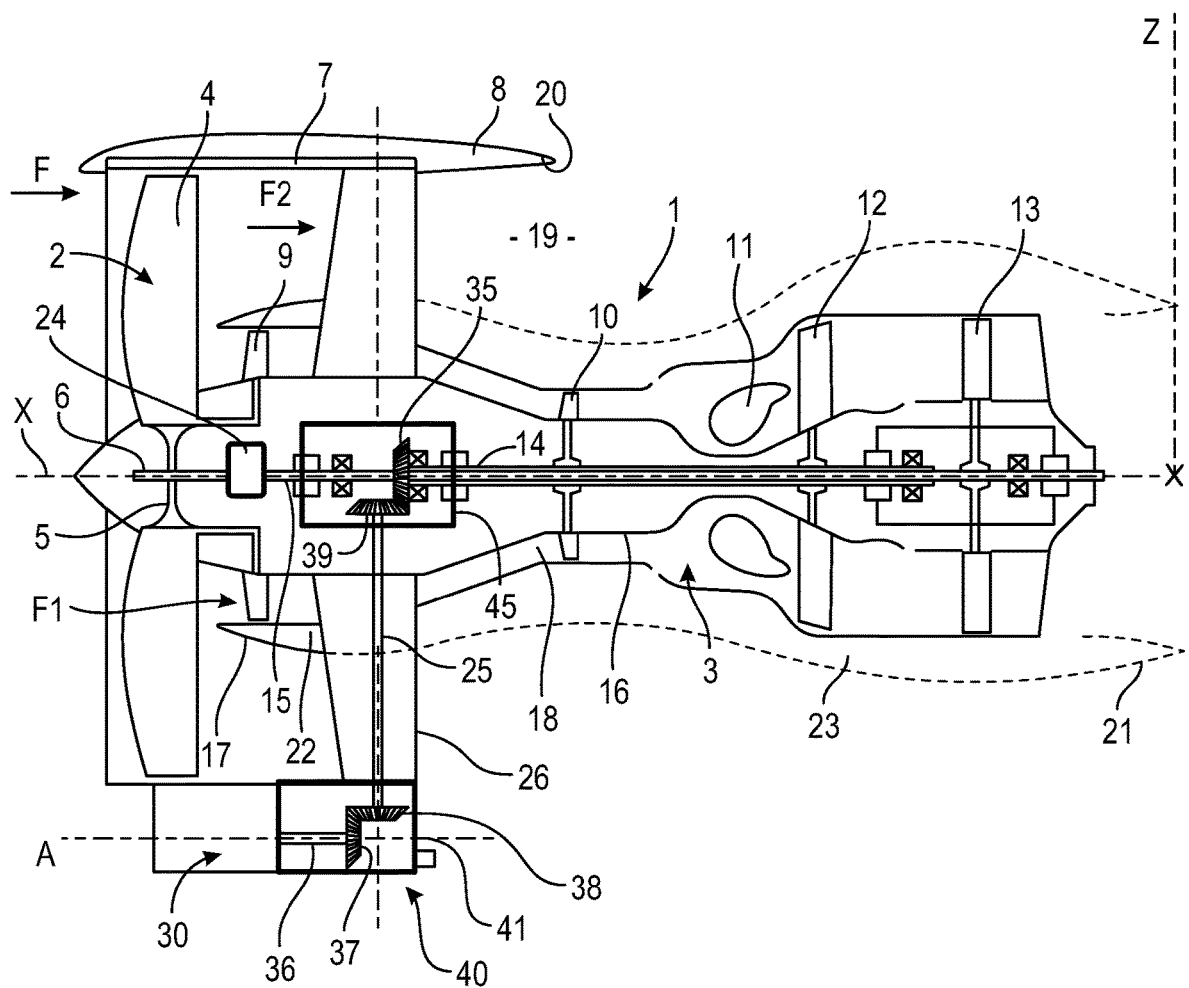
FIG. 1 is a schematic axial cross-sectional view of a double-flow turbomachine according to the invention.

FIG. 1 shows an axial cross-sectional view of a turbomachine 1 of longitudinal axis X to which the invention applies. The turbomachine shown is a dual-flow and dual-body turbomachine intended for mounting on an aircraft. Of course, the invention is not limited to this type of turbomachine.

In the present application, the terms "upstream", "downstream", "axial" and "axially" are defined with respect to the orientation of flowing of the gases in the turbomachine and also along the longitudinal axis (and even from left to right in FIG. 1). The terms "radial," "radially", "internal", and "external" are also defined with respect to a radial axis Z that is perpendicular to the axis X of the turbomachine.

This double-flow and double-body turbomachine 1 comprises a fan 2 that is mounted upstream of a gas generator or gas turbine engine 3. The fan 2 comprises a plurality of fan vanes 4 that extend radially from the periphery of a disc 5 through which a fan shaft 6 passes.

The turbomachine comprises a motor shaft that extends along the longitudinal axis in a first casing. A second casing is mounted around and coaxial with the first casing. A third casing is mounted around and coaxial with the second casing. The third casing is also coaxial with the first casing.

The gas generator 3 comprises from upstream to downstream and according to a schematic representation, a low-pressure (LP) compressor 9, a high-pressure (HP) compressor 10, a combustion chamber 11, a high-pressure turbine 12 and a low-pressure turbine 13. The HP compressor 10 is connected to the HP turbine via an HP shaft 14 centred on the longitudinal axis to form a first body referred to as high-pressure. The LP compressor is connected to the LP turbine via a LP shaft 15 centred on the longitudinal axis to form a second body referred to as low-pressure. The LP shaft 15 extends inside the HP shaft 14.

The HP shaft 14, which is a first motor shaft, is driven in rotation along the longitudinal axis in the first casing (referred to as internal casing 16).

The fan 2 is surrounded by the third casing (referred to as fan casing 7) which is coaxial with the internal casing 16. The fan casing 7 is carried by a nacelle 8 which extends around the gas generator 3 and along the longitudinal axis X. The fan shaft 6 is connected to a second motor shaft which drives it in rotation about the longitudinal axis X.

An air flow F that enters the turbomachine via the fan 2 is divided by a splitter nose 17 of the turbomachine into a primary air flow F1 that passes through the gas generator 3 and in particular in a primary duct 18, and into a secondary air flow F2 that circulates around the gas generator 3 in a secondary duct 19. The primary duct 18 and the secondary duct 19 are coaxial. The secondary air flow F2 is ejected by a secondary nozzle 20 terminating the nacelle 8, while the primary air flow F1 is ejected outside the turbomachine via an ejection nozzle 21 located downstream of the gas generator. The primary and secondary air flows meet at the outlet of their respective nozzles.

The primary duct 18 is at least partly radially delimited by the first casing (internal casing 16) and the second casing. The secondary duct 19 is at least partly radially delimited by the second casing and the third casing (fan casing 7 with the nacelle 8). An inlet casing 22 carries the splitter nose 17 upstream and is extended downstream by an inter-duct casing 23 which carries the ejection nozzle 21. The inter-duct casing 23 is the second casing.

Stator vanes, outlet guide vanes (known as OGV) (not shown) which structurally connect the inlet casing 22 to the fan casing 7, extend substantially radially into the secondary air flow and around the longitudinal axis X.

In this example, the second motor shaft is the LP shaft 15. A power transmission mechanism may be interposed between the fan shaft 6 and the LP shaft 15. The power transmission mechanism allows the speed of the fan 2 to be reduced to a lower speed than that of the LP shaft 15. On the other hand, the power transmission mechanism allows the arrangement of a fan with a large diameter in order to increase the bypass ratio. The bypass ratio of the fan is advantageously higher than 10. Preferably, the bypass ratio is between 15 and 20.

With reference to FIG. 1, the power transmission mechanism comprises a reducer 24, which is a planetary speed reducer. Of course, an epicyclic speed reducer is possible. The reducer is housed in a lubrication enclosure arranged upstream of the gas generator 3 and the annular internal casing 16. The gear train of the speed reducer 24 typically comprises a sun gear (or internal planetary) (not shown), a plurality of planet gears (not shown), a planet carrier (not shown), and a ring gear (external planetary) (not shown). The sun gear is centred on the longitudinal axis X and is coupled in rotation to the LP shaft along the longitudinal axis X. The planet gears are carried by the planet carrier and are each guided in rotation around a planet gear axis, here parallel to the longitudinal axis X. Each planet gear meshes with external toothings of the sun gear and internal toothings of the ring gear. In the case of a planetary gear, the planet carrier is locked in rotation and is secured to a stator casing of the turbomachine, and the ring gear, centred on the longitudinal axis X, surrounds the sun gear and is coupled in rotation with the fan shaft. In contrast, in the case of the epicyclic gear, the planet carrier is coupled in rotation with the fan shaft and the ring gear, which is attached in rotation, is secured to a stator casing of the turbomachine.

The turbomachine comprises a drive shaft 25 which is connected on the one hand to the high-pressure shaft 14 and on the other hand to at least one item of equipment or an accessory of the turbomachine. The item of equipment is designed to collect or inject power (mechanical or electrical) to the motor shaft (the high-pressure shaft). The item of equipment comprises at least one member which is driven in rotation by the high-pressure shaft 14 via the drive shaft. The drive shaft 25 extends substantially radially (e.g. at an inclined angle of between 5° and 25° to the radial axis) or radially. It also passes through a structural element which extends substantially radially at least partly between the internal casing 16 and the fan casing 7 and/or the nacelle 8.

In the present example, the structural element is a casing arm 26 which structurally connects the internal casing 16 to the fan casing 7. Alternatively, the structural element is a stator vane (OGV). In this case, the stator vane would be mounted in place of or axially adjacent to the arm 26.

With reference to FIGS. 3 to 6, there are two electric machines 30, 30'.

Each electric machine 30, 30' comprises a rotor and a stator so that additional electrical power is available in the turbomachine to supply various members of the turbomachine and/or of the aircraft. Each electric machine 30, 30' operates advantageously, but not restrictively, as a generator, i.e. it allows the conversion of mechanical energy into electrical energy. In particular, it collects mechanical power and transforms it into electrical energy. Each electric machine 30, 30' can of course be operated in motor mode so as to convert electrical energy into mechanical energy. The mechanical energy generated is injected into the turbomachine. In this example, the electric machine is reversible, i.e. it operates in generator and motor mode.

Figure 2:
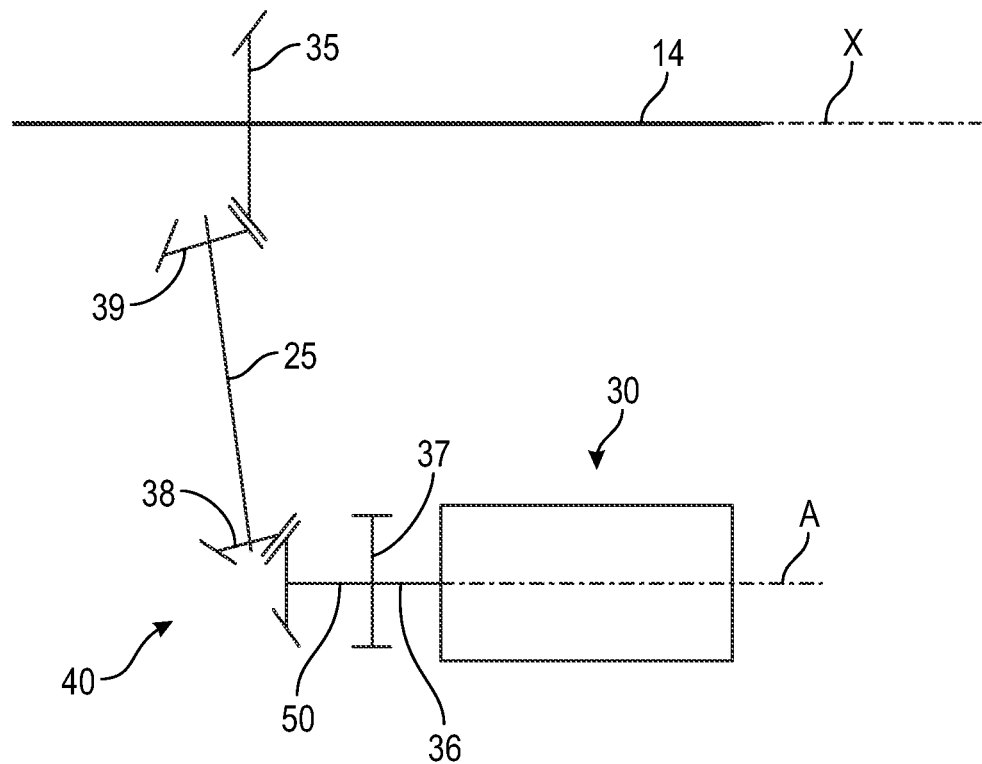
FIG. 2 is a schematic, partial and detailed view of a power transmission between a motor shaft of the turbomachine and an item of equipment of the turbomachine according to the invention.
Figure 3:
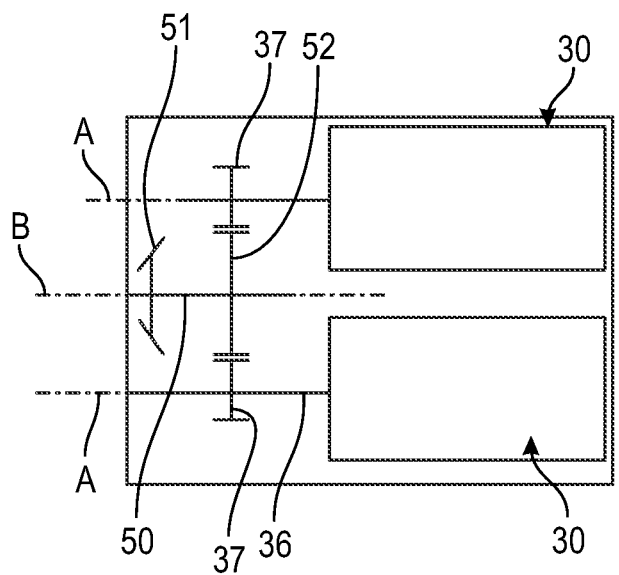
FIG. 3 is a schematic view of the arrangement of the electric machines arranged in parallel according to the invention.

As can be seen in FIGS. 1 to 3, an input wheel 35 is carried by the high-pressure shaft 14. This input wheel 35 is centred on the longitudinal axis and carries a series of teeth on its radially external surface. The input wheel 35 is advantageously conical. The speed reducer 24 is arranged upstream of this input wheel 35.

Each electric machine 30, 30' is coupled to a power transmission shaft 36 which has an axis of rotation A. Each power transmission shaft 36 comprises at one end an output wheel 37. The output wheel 37 is centred on the axis of rotation A and is toothed. Each output wheel 37 is also conical.

The substantially radial drive shaft 25 comprises a first end carrying a first input pinion 38 and a second end carrying a first output pinion 39. These pinions 38, 39 are toothed and conical.

Each output wheel 37 of the power transmission shaft 36 meshes with the first input pinion 38 of the drive shaft 25 via at least one main shaft 50. This main shaft 50 extends along an axis of rotation B. The main shaft 50 also comprises a first toothed wheel 51 and a second toothed wheel 52.

More specifically, the first input pinion 38 meshes with the first toothed wheel 51 forming an angle gear. The angle gear allows to transmit a rotational movement between two shafts that are not parallel.

The second toothed wheel 52 meshes with each output wheel 37 of the power transmission shafts 36.

The output wheel 37 of each power transmission shaft 36, the first input pinion 38 of the drive shaft 25 and the main shaft 50 (with its first and second toothed wheels 51, 52) form a first power transmission angle gear device 40. The latter is kinematically arranged between the drive shaft 25 and the electric machines 30, 30'.

According to the example in FIG. 1, the first power transmission angle gear device 40 is housed in a transmission case or casing 41 (see FIG. 4) which envelopes and supports the gears (formed by the pinions and wheels). In other words, the case 41 is hollow. Only one (single) case is provided here for the coupling of electric machines. The main shaft is housed in this case.

The case 41 is monobloc with the fan casing 7 (third casing). Advantageously, the case 41 is formed integral (i.e. came from matter) with the fan casing. Alternatively, the case 41 is attached to the fan housing by means of welding, threaded elements (screwed flanges, etc.), connecting rods or any other attachment means. Alternatively, the case 41 is monobloc with the nacelle 8.

Figure 5:
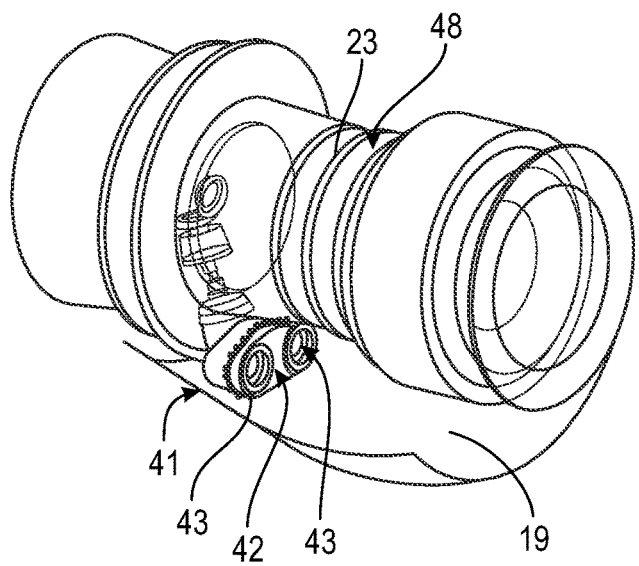
FIG. 5 is a perspective view of two electric machines mounted in a turbomachine according to the invention.

In another embodiment shown in FIG. 5, the case 41 which envelops and supports the gears (formed by the pinions and wheels) is monobloc with the inter-duct casing 23 (second casing). Advantageously, the case 41 is formed integral (i.e. came from matter) with the internal casing 23. The case may project radially outwards from a radially external surface 48 of the inter-duct casing. Alternatively, the case 41 is attached to the inter-duct casing by means of welding, threaded elements (screwed flanges, etc.), connecting rods or any other attachment means. In this case, the drive shaft 25 extends substantially radially between the internal casing 16 and the inter-duct casing 23.

In yet another embodiment not shown, the case 41 is monobloc with the internal casing 16. In particular, the case 41 came from matter with a wall of the internal casing. The case may project from a radially external or internal surface of the wall of the internal casing 16. Alternatively, the case 41 is attached to the internal casing by means of welding, threaded elements (screwed flanges, etc.), connecting rods or any other attachment means. In this case, the drive shaft extends substantially radially within the internal casing 16.

These configurations (case monobloc with the inter-casing or with the inter-duct casing) allow the electric machine to be placed as close as possible to the "core area" of the turbomachine and substantially parallel to the axis of the turbomachine. The "core area" is located in the internal casing 16 or in the inter-duct casing 23 (i.e. between the primary duct 18 and the secondary duct 19). In addition, the core area is a fire area (around the combustion chamber).

The case is made of a metallic material. The case 41 is made of a metallic material or a metallic alloy. Advantageously, but not restrictively, the metallic material or alloy comprises steel, aluminium, magnesium, titanium or a metal alloy.

The case can be produced by an additive manufacturing method, by casting or by machining.

Advantageously, the stator of each electric machine 30, 30' is attached to a stationary element and the rotor is linked to the kinematic chain. In particular, each stator is attached to the case 41. This one is for example mounted on the internal wall of the case. Alternatively each stator is mounted on the internal wall of an envelope 46 of the electric machine 30, which envelope is stationary and also attached to the case 41. The envelope 46 of each electric machine 30 may, according to the embodiments described above, be attached to the internal casing 16, the internal-duct casing 23 or the fan casing 7. The rotor of the electric machine 30 is coupled in rotation with the power transmission shaft 36.

Figure 4:
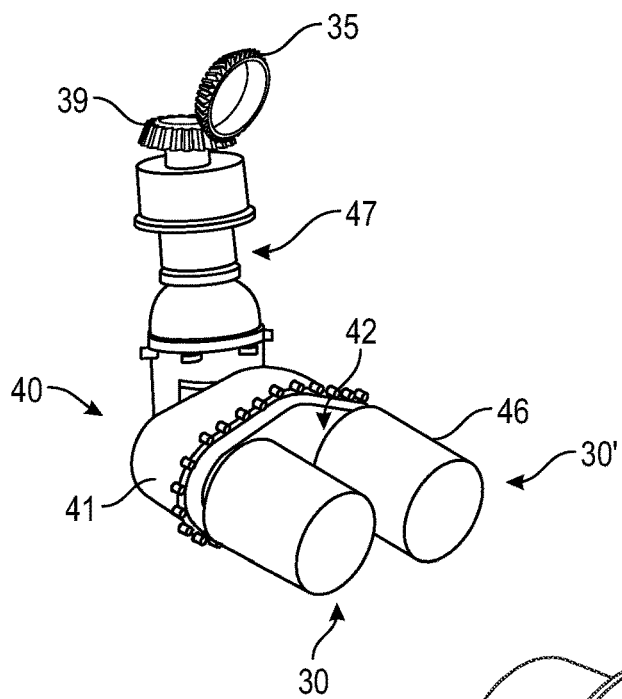
FIG. 4 is a perspective view of two electric machines coupled to a mechanical transmission angle gear device mounted in a case according to the invention.

In FIGS. 4 and 5, the case 41 comprises a coupling surface 42 which is defined in a plane that is perpendicular to the axis of rotation of the main shaft 50. The plan is substantially radial. In particular, this coupling surface 42 is generally flat. By "generally flat" we mean that the surface is flat or is curved with a small radius of curvature. The coupling surface 42 is provided with through orifices 43. Each power transmission shaft 36, coupled to an electric machine 30, 30' extends from the coupling surface 42, through a through orifice 43. The power transmission shaft 36 of each electric machine extends at least partly into the case 41.

As shown in FIG. 4, the drive shaft 25 is also housed in a casing 47 which is attached to the case 41 via attachment members. The attachment members comprise, for example, screws, nuts, bolts or any element that allows a quick and non-destructive mounting and dismounting of the cases and casings. In particular, the case 41 comprises an interface surface which is defined in a plane perpendicular to the drive shaft 25. An opening is defined in this interface surface from which the drive shaft 25 rises. The latter is housed at least partly in the case 41. The drive shaft 25 is enveloped by the casing 47 which is also hollow. The drive shaft 25 passes through the casing 47. The casing 47 also comprises an interface surface complementary to the interface surface of the case and an orifice coaxial with the opening of the case 41. The first output pinion 39 extends outside the casing 47.

In the examples of FIGS. 2 to 5, the axes of rotation A of the power transmission shafts 36 are parallel to the longitudinal axis X. The rotation shafts A are also parallel to each other. The axes are also defined in a same plane.

In one example of embodiment, as shown in FIG. 1, each electric machine 30 is arranged radially outside the fan casing 7. Advantageously, it is installed in the nacelle 8. The latter offers more latitude for the integration of the electric machine or machines as it is less bulky with items of equipment than in other portions of the turbomachine.

In another embodiment such as that shown in FIG. 5, each electric machine 30, 30' is arranged in the flow duct 19 of the secondary air duct. The electric machines are housed around a radially external surface 48 of the inter-duct casing. Advantageously, but not restrictively, the electric machine 30 is arranged substantially flush with the radially external surface 48 of the second casing, here the inter-duct casing 23. The installation of the electric machines at this location allows an overall dimension gain. In addition, the secondary flow of the secondary duct, in which the electric machines extend, allows them to be cooled.

By substantially flush, we mean that the envelopes of electric machines can be mounted directly on the surface of the casings or at a distance from it so as to allow an air circulation.

In addition, the input wheel 35 meshes with the first output pinion 39 of the drive shaft 25 to form an angle gear. In particular, the input wheel 35 and the first output pinion 39 form a second power transmission angle gear device 45 which is arranged between the high-pressure shaft 14 and the drive shaft 25. The cooperation between the input wheel 35 and the first output pinion 39 ensures that, when the high-pressure shaft 14 rotates along its longitudinal axis, the drive shaft 25 also rotates along its substantially radial axis. In this way, the rotation of the drive shaft causes the power transmission shafts 36 of each electric machine 30, 30' to rotate along their axes of rotation A.

Thus, in the case of a motor operation of the electric machines, the power transmission shafts 36 provide them with mechanical power when they rotate, which is converted into electrical power. This additional electrical power will be available once the turbomachine has started up, and in particular during the flight and in landing phase. The electrical energy can be stored advantageously in an on-board energy storage element in the aircraft, such as a battery or at least one fuel cell. The electric machines and the storage element are electrically connected.

The turbomachine is also equipped with an electric motor which is intended to be supplied with electric current by each electric machine (in motor mode). For this purpose, the electric motor and each electric machine 30, 30' are electrically connected by an electrical wiring. This electric motor is arranged at the level of the fan casing and downstream of the electric machines. In the case of power injection on one of the motor shafts, the electrical power produced by the electric machines is sent to the motor shaft by means of the electric motor or alternatively via the battery or the fuel cell. The electric power drives in rotation the drive shaft, which in turn drives the motor shaft, in this case the high-pressure shaft 14. This allows to improve the engine performance, for example, and reduces the fuel consumption to supply the combustion chamber.

Figure 6:
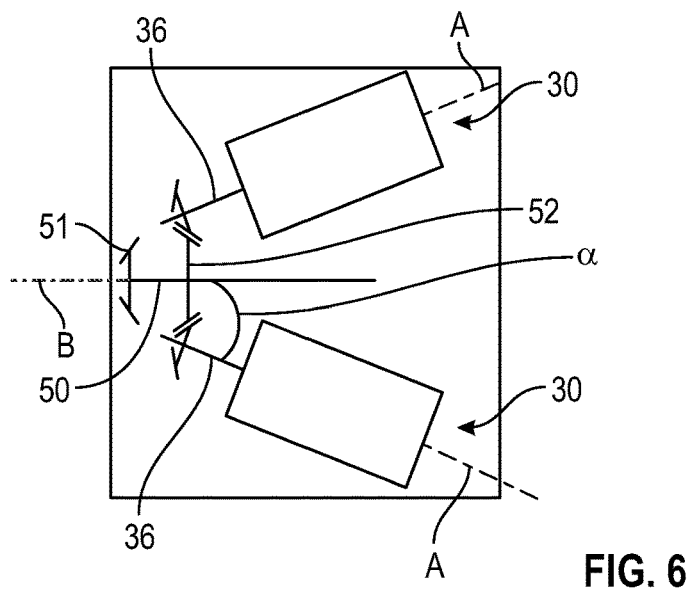
FIG. 6 is a further embodiment of an arrangement of two electric machines inclined to each other according to the invention.

In another embodiment shown in FIG. 6, the power transmission shafts 36 are inclined to each other (in a plane in which the axes A are defined). Each axis of rotation A forms an angle α (alpha) of approximately 45° with the axis of rotation B of the main shaft 50. This arrangement allows to avoid oil pipelines running into the secondary duct. The first and second power transmission shafts 36 form substantially a V, with the summit of the V formed by the first toothed wheel 51.

The two electric machines 30, 30' operate simultaneously and create a redundancy so that more mechanical or electrical power is available. In particular, this allows a minimum of power to be available if one of the electric machines fails. In one example of embodiment, the electric machines 30, 30' can be operated independently of each other.

The axes of the first and second power transmission shafts 36 are defined in the same radial plane, perpendicular to the longitudinal axis.

The machine or the machines is/are configured to inject mechanical power to the high-pressure shaft through the electric motor that drives it in rotation.

The invention claimed is:

1. A turbomachine comprising a fan, a first casing with a longitudinal axis X in which a motor shaft is driven in rotation along the longitudinal axis X, a second casing surrounding and coaxial with the first casing, and a drive shaft connected to the motor shaft and to at least two electric machines via a power transmission angle gear device housed in a case, the electric machines being configured to collect from or to inject power into the motor shaft, the power transmission angle gear device comprising a main shaft with an axis parallel to the longitudinal axis and configured to drive power transmission shafts of the two electric machines, the case comprising a coupling surface to which the two electric machines are coupled, wherein the main shaft housed in the case comprises a first toothed wheel meshing with a first input pinion mounted on a first end of the drive shaft and a second toothed wheel configured to mesh with at least two output wheels that are each respectively carried by a power transmission shaft coupled to the corresponding electric machine.

2. The turbomachine according to claim 1, wherein the case is formed integral with the second casing.

3. The turbomachine according to claim 1, wherein each a power transmission shaft of each electric machine passes through the coupling surface, each power transmission shaft being arranged perpendicular to the coupling surface.

4. The turbomachine according to claim 1, wherein the power transmission shafts of the electric machines are arranged parallel to each other.

5. The turbomachine according to claim 1, wherein the power transmission shafts of the electric machines are inclined with respect to each other.

6. The turbomachine according to claim 1, wherein the drive shaft extends radially at least partly between the first casing and the second casing.

7. The turbomachine according to claim 1, wherein the motor shaft comprises an input wheel coaxial with the longitudinal axis X and cooperating with a first output pinion mounted at a second end of the drive shaft.

8. The turbomachine according to claim 7, wherein the drive shaft is housed in a structural element which is a casing arm or a stator vane and which extends at least partly between the first casing and the second casing.

9. The turbomachine according to claim 1, further comprising a third casing which is coaxial with and surrounds the second casing, the second casing and the third casing delimiting at least partly a flow duct for a secondary air flow generated by the fan, and wherein the electric machines are arranged in the flow duct.

10. The turbomachine according to claim 1, wherein each electric machine comprises an envelope which is attached to the first casing, the second casing, or the third casing.

11. The turbomachine according to claim 1, wherein each electric machine comprises a stator and a rotor, each rotor being coupled in rotation to the corresponding power transmission shaft.

12. The turbomachine according to claim 1, wherein the drive shaft is enveloped by a casing which comprises an interface surface complementary to an interface surface of the case, the casing comprising an orifice coaxial with an opening of the case, a first output pinion of the drive shaft extending outside the casing.

* * * * *